(12) United States Patent
Lockett

(10) Patent No.: US 10,108,902 B1
(45) Date of Patent: *Oct. 23, 2018

(54) METHODS AND APPARATUS FOR ASYNCHRONOUS AND INTERACTIVE MACHINE LEARNING USING ATTENTION SELECTION TECHNIQUES

(71) Applicant: CS Disco, Inc., Houston, TX (US)

(72) Inventor: Alan Lockett, Sugar Land, TX (US)

(73) Assignee: CS Disco, Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/707,621

(22) Filed: Sep. 18, 2017

(51) Int. Cl.
*G06N 3/08* (2006.01)
*G06N 3/04* (2006.01)

(52) U.S. Cl.
CPC .............. *G06N 3/08* (2013.01); *G06N 3/04* (2013.01)

(58) Field of Classification Search
CPC ........ G06N 99/005; G06N 5/02; G06N 5/022; G06N 5/04; G06N 7/005; G06N 3/08; G06N 3/04; G06F 19/345; G06F 17/30867
USPC ........................................................ 706/11
See application file for complete search history.

(56) References Cited

U.S. PATENT DOCUMENTS

| | | | | |
|---|---|---|---|---|
| 6,728,695 B1* | 4/2004 | Pathria | ............... | G06F 17/2715 |
| 9,058,327 B1* | 6/2015 | Lehrman | ........... | G06F 17/30707 |
| 2007/0150801 A1* | 6/2007 | Chidlovskii | ........ | G06F 17/2247 |
| | | | | 715/210 |
| 2008/0082466 A1* | 4/2008 | Meijer | ................... | G06N 7/005 |
| | | | | 706/12 |
| 2008/0228749 A1* | 9/2008 | Brown | .............. | G06F 17/30796 |
| 2011/0103682 A1* | 5/2011 | Chidlovskii | ......... | G06K 9/6284 |
| | | | | 382/159 |
| 2012/0123978 A1* | 5/2012 | Toderice | ........... | G06F 17/30799 |
| | | | | 706/12 |
| 2016/0371261 A1 | 12/2016 | Cormack et al. | | |
| 2017/0060835 A1* | 3/2017 | Radford | ................ | G06F 17/277 |
| 2017/0278510 A1* | 9/2017 | Zhao | .................... | G06F 17/2785 |

OTHER PUBLICATIONS

Yin W. et al., "ABCNN: Attention-Based Convolutional Neural Network for Modeling Sentence Pairs", Apr. 9, 2016.*
Dong F. et al., "Attention-based Recurrent Convolutional Neural Network for Automatic Essay Scoring", Proceedings of the 21st Conference on Computational Natural Language Learning (CoNLL 2017), pp. 153-162, Vancouver, Canada, Aug. 3-Aug. 4, 2017.*

(Continued)

*Primary Examiner* — Dave Misir
(74) *Attorney, Agent, or Firm* — Cooley LLP

(57) ABSTRACT

A non-transitory medium includes code representing processor-executable instructions; the code causes a processor to produce, via a machine learning model, a predicted value of a membership relationship between a data object and a target tag. The code causes the processor to display, via a user interface, the data object and the target tag and indicate a non-empty set of identified sections of one or more attributes of data object supporting the membership relationship between the data object and the target tag. The code also causes the processor to receive a tag signal, via the user interface, indicating one of an acceptance tag signal, a dismissal tag signal, or a corrective tag signal, and re-train the machine learning model based at least in part on the tag signal.

19 Claims, 10 Drawing Sheets

(56) References Cited

OTHER PUBLICATIONS

Kotzias D. et al., "From Group to Individual Labels using Deep Features", KDD'15, Aug. 10-13, 2015, Sydney, NSW, Australia.*

Denil M. et al., "Extraction of Salient Sentences from Labelled Documents", Feb. 28, 2015.*

R. Collobert, J. Weston, L. Botou, M. Karlin, K Kavukcuoglu, and R Kuksa. Natural language processing (almost) from scratch. Journal of Machine Learning Research, 12, 2011. Available at https://arxiv.org/pdf/1103.0398.pdf.

G. Cormack and M. Grossman. Evaluation of machine-learning protocols for technology-assisted review in electronic discovery, 2014. Avail-able at http://plg2.cs.uwaterloo.ca/~gvcormac/calstudy/study/sigir2014-cormackgrossman.pdf.

M. Denil, A. Demiraj, and N. de Freitas. Extraction of salient sentences from labelled documents, 2015. Available at https://arxiv.org/pdf/1412.6815.pdf.

S. Funk. RMSprop loses to SMORMS3—Beware the Epsilon! 2015. Available at http://sifter.org/~simon/journal/20150420.html.

Google. Deep dream generator, 2015. On the web at https://deepdreamgenerator.com.

G. Hinton. Overview of Minibatch Gradient Descent, 2013. Available at http://www.cs.toronto.edu/~tijmen/csc321/slides/lecture_slides_lec6.pdf.

R. Johnson and T. Zhang. Effective Use of Word Order for Text Categorization with Convolutional Neural Networks, 2015. Available at https://arxiv.org/pdf/1412.1058.pdf.

N. Kalchbrenner, E. Greffenstette, and C. Blunsom. A Convolutional Neural Network for Modelling Sentences, 2014. Available at https://arxiv.org/pdf/1404.2188.pdf.

Y. Kim. Convolutional Neural Networks for Sentence Classification, 2014. Available at https://arxiv.org/pdf/1408.5882.pdf.

D. P. Kingma and J. L Ba. Adam: A method for stochastic optimization. In Proceedings of the 2017 International Conference on Learning and Representations (ICLR-17), 2017. Available at https://arxiv.org/pdf/1412.6980.pdf.

T. Mikolov, L. Chen, G. Corrado, and J. Dean. Efficient estimation of word representations in vector space. In Proceedings of the 2013 International Conference on Learning and Representation, 2013. Available at https://arxiv.org/pdf/1301.3781.pdf.

V. Nair and G. Hinton, Rectified linear units improve restricted boltzmann machines. In Proceedings of the 27th Conference on Neural Information Processing Systems, 2010. Available at http://machinelearning.wustl.edu/mlpapers/paper_files/icml2010_NairH10.pdf.

F. Olsson. A literature survey of active machine learning in the context of natural language processing, 2009. Available at http://eprints.sics.se/3600/.

J. Pennington, S. R., and M. C. GLoVe: Global Vectors for Word Representation, 2014. Available at https://nlp.stanford.edu/pubs/glove.pdf.

Z. Yang, D. Yang, C. Dyer, X. He, A. Smola, and E. Hovy. Hierarchical attention networks for document classification. In Proceedings of the 15th Conference of the North American Chapter of the Association of Computational Linguistics, 2016. Available at https://www.cs.cmu.edu/-hovy/papers/16HLT-hierarchical-attention-networks.pdf.

D. Bau, B. Zhou, A. Khosla, A. Oliva, and A. Torralba. Network dissection: Quantifying interpretability of deep visual representations, 2017. CSAIL, MIT. Available at https://arxiv.org/pdf/1704.05796.

M. Bojarski, P. Yeres, A. Choromanaska, K. Choromanaski, B. Fimer, L. Jacket, and U. Muller. Explaining how a deep neural network trained with end-to-end learning steers a car, 2017. NVIDIA Corporation. Available at https://arxiv.org/pdf/1704.07911.pdf.

P. Kindermans, K. Schutt, A. M., K. Muller and Dahne. Patternnet and patternirp: Improving the interpretability of neural networks, 2017. TU—Berlin, Germany. Available at https://arxiv.org/pdf/1705.5598.

* cited by examiner

From: Holst
Sent: Saturday, October 13, 2001 6:01 PM CDT
To: Grigsby; Mike
CC: Allen; Phillip K.; Smith; Matt
Subject: West Fundies

601

Mike,

Following is a west fundies update. We have not yet produced an abundance of finished product, but several great projects are in the development stage. These projects are making nice progress even though it may not be visible to the casual observer.

PRODUCTION

This effort is being led by Tori and supported by both Jay and myself. Gaskill's staff will be providing most of the manpower. The concept is to design a model which takes a methodical and scientific approach in forecasting: (1) declines of existing production, (2) increases due to drilling.

Existing production

Using externally provided production data, we are in the process of dividing production into zones of the characteristics. Each zone will be identified by: Basin --> Reservoir --> Formation. Analysis will be done at the zone level to determine its unique depletion curve. This curve will be extrapolated to forecast future production from existing wells.

603

New production

From rig count data (or completion data if we buy the more expensive database) we can determine which zones a new well is targeting. Forecasted production can then be determined by applying a recent historical success ratio and the corresponding depletion curve identified in the preceding step. The difficult component to forecast with great accuracy is future drilling. Our current thinking is a calculation that considers forward prices, drilling costs (which are increasing since all the "easy wells" have already been drilled), and common required rates of return.

FIG. 6

Uncertainty with respect to monetary policy has clouded the board's ability to predict relevant future decisions. Revenue projections have consequently been adjusted to reflect the prevailing rate environment. stments may be necessary as the situation warrants subject to furby the board.

METHODS AND APPARATUS FOR ASYNCHRONOUS AND INTERACTIVE MACHINE LEARNING USING ATTENTION SELECTION TECHNIQUES

CROSS-REFERENCE TO RELATED PATENT APPLICATIONS

This patent application is related to U.S. patent application Ser. No. 15/635,361, filed on Jun. 28, 2017 entitled "Methods and Apparatus for Asynchronous and Interactive Machine Learning Using Word Embedding Within Text-Based Documents and Multimodal Documents," the entire contents of which is hereby incorporated by reference.

FIELD

At least one embodiment described herein relates generally to predictive coding of a data corpus, using machine learning techniques.

BACKGROUND

One of the practical challenges for machine learning models is that the logic they use to classify content data is often concealed from users, causing skepticism, mistrust, and difficulty to understand why a machine learning model classifies an input in a particular way as opposed to another. In addition, building supervised machine learning models can be a time consuming task that involves the collection of training sets that are representative of the different types of inputs and outputs expected to be processed by a machine learning model. Once a machine learning model is trained and deployed, it can be difficult to identify and repair machine learning errors caused by underfitting or overfitting the machine learning model.

Therefore, a need exists for methods and apparatus to rapidly train and identify logic used by machine learning models to generate outputs.

SUMMARY

At least one embodiment described herein addresses the need for machine learning solutions for the classification of multiple types of data. In some embodiments, a non-transitory medium includes code representing processor-executable instructions; the code causes a processor to produce, via a machine learning model, a predicted value of a membership relationship between a data object and a target tag. The code causes the processor to display, via a user interface, the data object and the target tag and indicate a non-empty set of identified sections of one or more attributes of data object supporting the membership relationship between the data object and the target tag. The code also causes the processor to receive a tag signal, via the user interface, indicating one of an acceptance tag signal, a dismissal tag signal, or a corrective tag signal, and re-train the machine learning model based at least in part on the tag signal.

BRIEF DESCRIPTION OF THE DRAWINGS

FIG. 6 is an example of highlighted sections of a data object predicted to be associated with a tag target, according to an embodiment.

DETAILED DESCRIPTION

Figure 1:
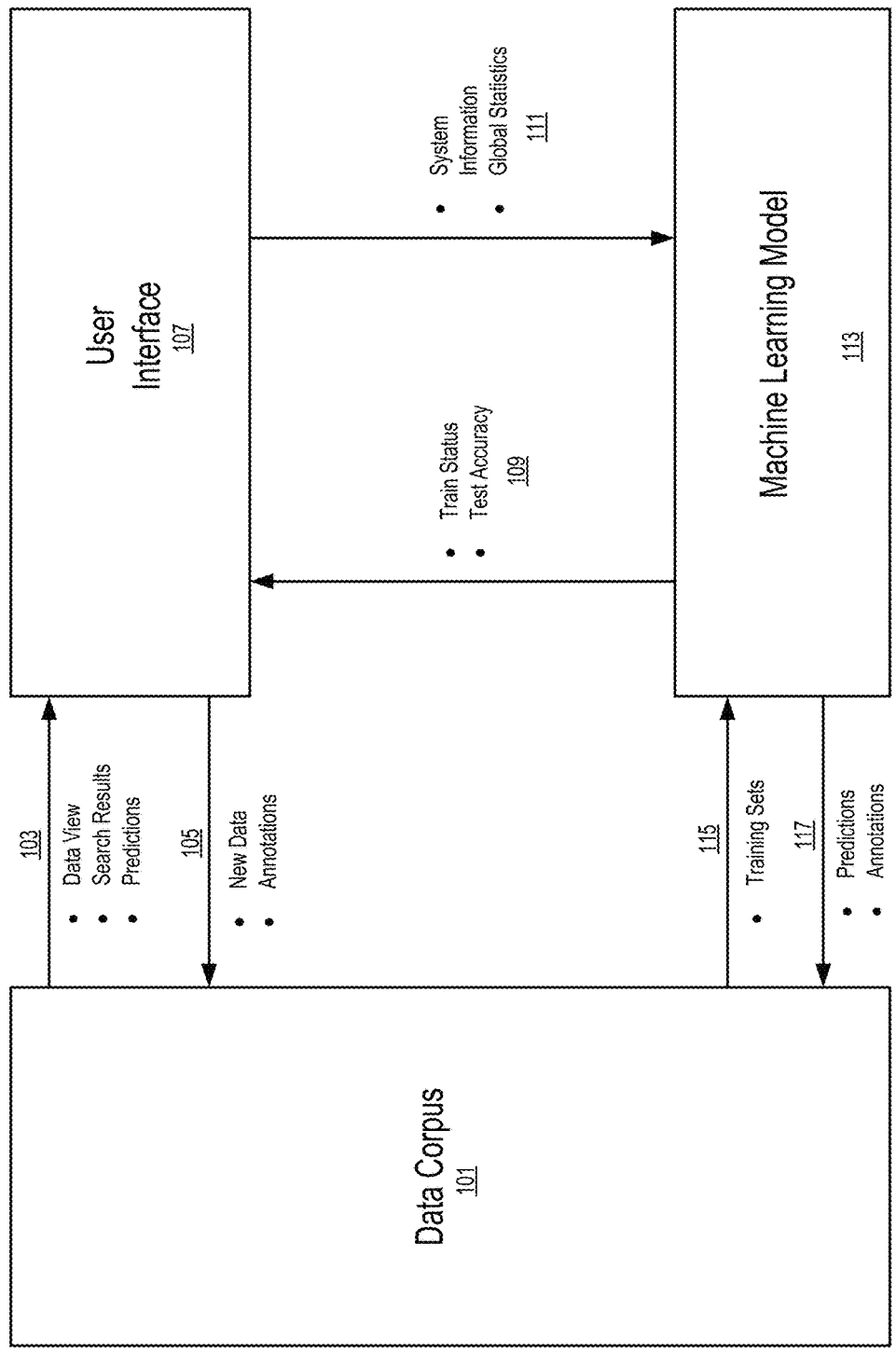
FIG. 1 is a block diagram of an implementation of a system for asynchronous and interactive machine learning using word embedding within text-based and multimodal documents, according to an embodiment.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for providing a thorough understanding of the subject technology. It will be however, clear and apparent that the subject technology is not limited to the specific details set forth herein and may be practiced without these specific details.

The terms "computer", "processor", "computer processor", "compute device" or the like should be expansively construed to cover any kind of electronic device with data processing capabilities including, by way of non-limiting example, a digital signal processor (DSP), a microcontroller, a field programmable gate array (FPGA), an application specific integrated circuit (ASIC), or any other electronic computing device comprising one or more processors of any kind, or any combination thereof.

As used herein, the phrase "for example," "such as," "for instance," and variants thereof describe non-limiting embodiments of the presently-disclosed subject matter. Reference in the specification to "for example," "such as", "for instance," or variants thereof means that a particular feature, structure or characteristic described in connection with the embodiment(s) is included in at least one embodiment of the presently-disclosed subject matter. Thus the appearance of the phrase "for example," "such as", "for instance," or variants thereof does not necessarily refer to the same embodiment(s).

It is appreciated that, unless specifically stated otherwise, certain features of the presently-disclosed subject matter, which are, for clarity, described in the context of separate embodiments, may also be provided in combination in a single embodiment. Conversely, various features of the presently-disclosed subject matter, which are, for brevity, described in the context of a single embodiment, can also be provided separately or in any suitable sub-combination.

In some implementations, an Asynchronous and Interactive Machine Learning (AIML) system sorts documents or data objects for legal review during legal discovery according to a predicted likelihood that a reviewer will apply one or more tags to the document or data object. At a general level, the AIML system executes a machine-assisted iterative search over a data corpus. The examples described below are illustrated in the context of legal discovery, however, the AIML system can be analogously used for a variety of applications including business intelligence, investigative research, surveillance, and other suitable contexts. AIML system can be adapted for explorative learning in large corpora including heterogeneous, non-textual data, such as financial data, satellite or medical imagery, or sensor streams.

Interacting elements of some implementations of the AIML system are discussed with reference to FIG. 1. Data corpus 101 can include thousands, millions and sometimes billions of data objects, however, the number of data objects can grow or shrink over time. The nature of the data in the data objects depends on a particular application, for instance, in the context of legal discovery, data objects can include data related to one or more of the parties engaged in a litigation or dispute. Each data object included in data corpus 101 contains a collection of attributes and a set of relationships that the data object holds with respect to other data objects in the corpus. Data objects can be augmented by the AIML system over time to include annotations about how a user interacts with the data objects in the AIML system. An illustrative example of a data object is a text-based document data object produced from text-based documents such as an e-mail, a Portable Document Formal (PDF) file or other suitable digital representation of assembled textual data. In some instances, data objects include metadata; for instance, an e-mail document can include a sender identifier, the recipient identifier, and a timestamp indicating when the e-mail was sent. An email document can further include one or more relationship fields indicating a relationship between such an email and other data objects. For example, an email data object can hold a relationship with a data object containing data of a PDF file that was sent with the email as an attachment. For another example, a first email data object can hold a relationship with a second email data object, which was sent in response to the first email data object. Further details regarding data objects are discussed below with reference to FIG. 5.

In some implementations, user interface 107 includes widgets or graphical controllers to add, remove, view, and annotate data as shown at 105 in the data corpus 101. For instance, a user can make annotations called tags to mark subsets of the data that are of special interest or relevance for a discovery project or add new data to data corpus 101. In some implementations, tag targets can be defined by a user while in other implementations, tag targets can be imported from other previously analyzed data corpus different from data corpus 101. The tag targets defined or included in the AIML system are used by users to classify or code data objects of data corpus 101 with tags. Each tag target is a non-empty subset of the data determined by data attributes and relationships. In some instances, a user's goal in interacting with the system is to mark all data objects belonging to the each tag target with a single corresponding tag.

In some instances, an AIML system produces one output per tag target including a set of data objects within the corpus that are associated with that tag target. At any point in time, for any particular tag target, a user can identify, highlight, and annotate with a tag target an attribute value, an attribute region (or section), or a portion of a data object associated with a tag. User initiated highlights and annotations are sometimes referred herein as positive salience highlights. In some instances, when a new data corpus is received or configured at the AIML system, none of the data objects in the data corpus are initially associated with a tag target. Users can view data objects included in data corpus 101, search for keywords, and receive predictions (as shown at 103). In some implementations, predictions can include one or more data objects, a predicted tag target or membership relation to a tag target and a probability, likelihood, or membership degree associated with such a prediction or membership relation. In some instances, predictions in the form of probability can be received by a user via user interface 107 indicating a probability that a particular user will mark or annotate a data object with a certain tag. In some other instances, predictions in the form of a membership relation between a data object and a tag target can be received by a user via user interface 107 indicating a membership degree between a data object and one or more distinct tag targets.

Iterative machine learning model 113 analyzes user interactions to (a) recommend to a user those data objects which are likely to belong (e.g. predictions) to each tag target, and (b) to produce additional data annotations visible to the user that assist in identifying all data objects in the tag target, as shown at 117. An example of such annotations is discussed below with reference to FIG. 8. In some instances, a user can terminate interactions with data corpus 101 via the AIML system when the user concludes that all data objects in each tag target have been marked with a tag target.

In some implementations, machine learning model 113 is used to annotate data objects in the data corpus in part or in whole with new information, including the machine's predictions regarding tag targets as well as ancillary data such as highlighting, described below with reference to FIG. 6. The user continues to annotate data objects, now with the additional support or suggestions produced by machine learning model 113 through, for instance, machine-generated annotations. Machine learning model 113 is continuously refit to the current state of the annotations, either with or without re-initialization of model parameters. Such retraining of machine learning model 113 is an event triggered by the arrival of a sufficient amount of data determined, for example, based on a threshold corresponding to a constant number of elements of a training set.

In some implementations, annotations used during the training phase of machine learning model 113 can include positive decisions to tag one or more documents. Likewise, negative decisions can be inferred when, for example, a user explicitly marks a document as reviewed without accepting or applying a predicted tag or when the user manually applies a different tag to a document object than the predicted tag. These positive and negative decisions are referred to herein as tag signals. In some implementations, annotations can include other data, such as information about whether a document object has been viewed by a user without applying any tag, or global information such as the results of sampling exploration to determine the prevalence of a tag target, shown at 111. In some implementations, machine learning model 113 can be fit or trained for a first time after a threshold of, for example, fifty data objects positively tagged with the same tag target has been reached. Data objects included in training sets 115 are extracted from data corpus 101.

In some implementations, the AIML system retrains machine learning model 113 whenever the model has been trained after a first time and either some new tag target has reached the predetermined threshold of positive signals or else a previously trained tag has received a number of new tag signals that is multiple of the predetermined threshold, for instance, when the number of new tag signals reaches two times the constant number of elements of a training set. In some instances, the tag signals can indicate a user's confirmation, correction, or dismissal (negative signal) of a predicted output produced by the AIML system. Thus, in some instances, the AIML system can retrain machine learning model 113 after receiving confirmation, correction or dismissal tag signals, improving the AIML system predictive accuracy, resulting in, for example, a lesser number of false positive or false negative predictive outputs. The threshold corresponding to a constant number of elements of a training set is a parameter that can be configured, for instance, via user interface 107. In other words, in some implementations, predetermined thresholds are not hard-coded in the AIML system but rather, can be defined by a user via user interface 107. Accordingly, in some instances, the AIML system can initiate the training of machine learning model 113 as early as the first positive signal arrives data corpus 101 and can continue retraining model 113 in sequence or in parallel without interruptions to users of the AIML system.

Training status, indicating for instance, whether machine learning model 113 has been trained with respect to a particular tag target and predictive accuracy 109 of machine learning model 113 can be displayed to a user via user interface 107. After being trained, machine learning model 113 writes at 117 machine-generated judgements, predictions, annotations, and other suitable data into data corpus 101.

Internal structures of an implementation of an AIML server 200 are discussed with reference to the compute device shown in FIG. 2. Bus 225 represents system, peripheral, and/or chipset buses that communicatively couple numerous internal devices of AIML server 200. For instance, bus 225 communicatively couples processor 201 with read-only memory 211, system memory 215, network communication interface 217, and user interface 107. Processor 201 can retrieve instructions and data structures to execute the processes of embodiments described herein from system memory 215, ROM 211 or other suitable memory coupled to AIML server 200.

Processor 201 can be a single processor, a multi-core processor, or an arrangement of processors in different implementations. In some instances, processor 201 can be any suitable processor such as, for example, a general-purpose processor, a field programmable gate array (FPGA), an application specific integrated circuit (ASIC), a Graphical Processing Unit (GPU), a virtual processor, and/or other suitable hardware device.

ROM 211 stores static data and instructions used by processor 201 and/or other components of AIML server 200. System memory 215 can be a read-and-write memory device. System memory 215 stores some of the processor-executable instructions and data structures that processor 201 uses at runtime, for instance, processor-executable instructions to run tokenizer 203, word embedder 205, feature extractor 207, machine learning model 113, and run other suitable processes of the AIML server 200. Likewise, system memory 215 can store data corpus 101, a set of tag targets 219 and other suitable data structures used by the AIML server 200. Data corpus 101 includes data objects having attributes and logic relationships with other data objects. Tag targets 219 represent classes to which data objects can belong, for instance, a data object can be a member of a class defined by a first tag target and a second tag target.

Tokenizer 203 tokenizes text-based documents into words, then converts each word into a vocabulary index to produce a sequence of M positive integers, each integer associated with an index of a token in the vocabulary. Word embedder 205 can include multiple models to map words into a continuous vector-space based on the words' distributional properties as observed in a raw data corpus. Feature extractor 207 encodes data objects into a feature space X based on data objects' attributes and annotations. Machine learning model 113 can include one or more of an artificial neural network model, probabilistic model, supervised machine learning model, unsupervised machine learning model, deep learning models, and other suitable models.

User interface 107 enables users or non-person entities to interact with the AIML server 200. User interface 107 receives inputs such as, tag signals, document annotations, new defined tag targets and other suitable inputs. User interface 107 produces outputs related to monitored user interactions with the AIML system, data objects, search results, predictions and other suitable outputs. In some implementations, user interface can include a graphical user interface with a collection of controllers or widgets to support user interactions.

Figure 2:
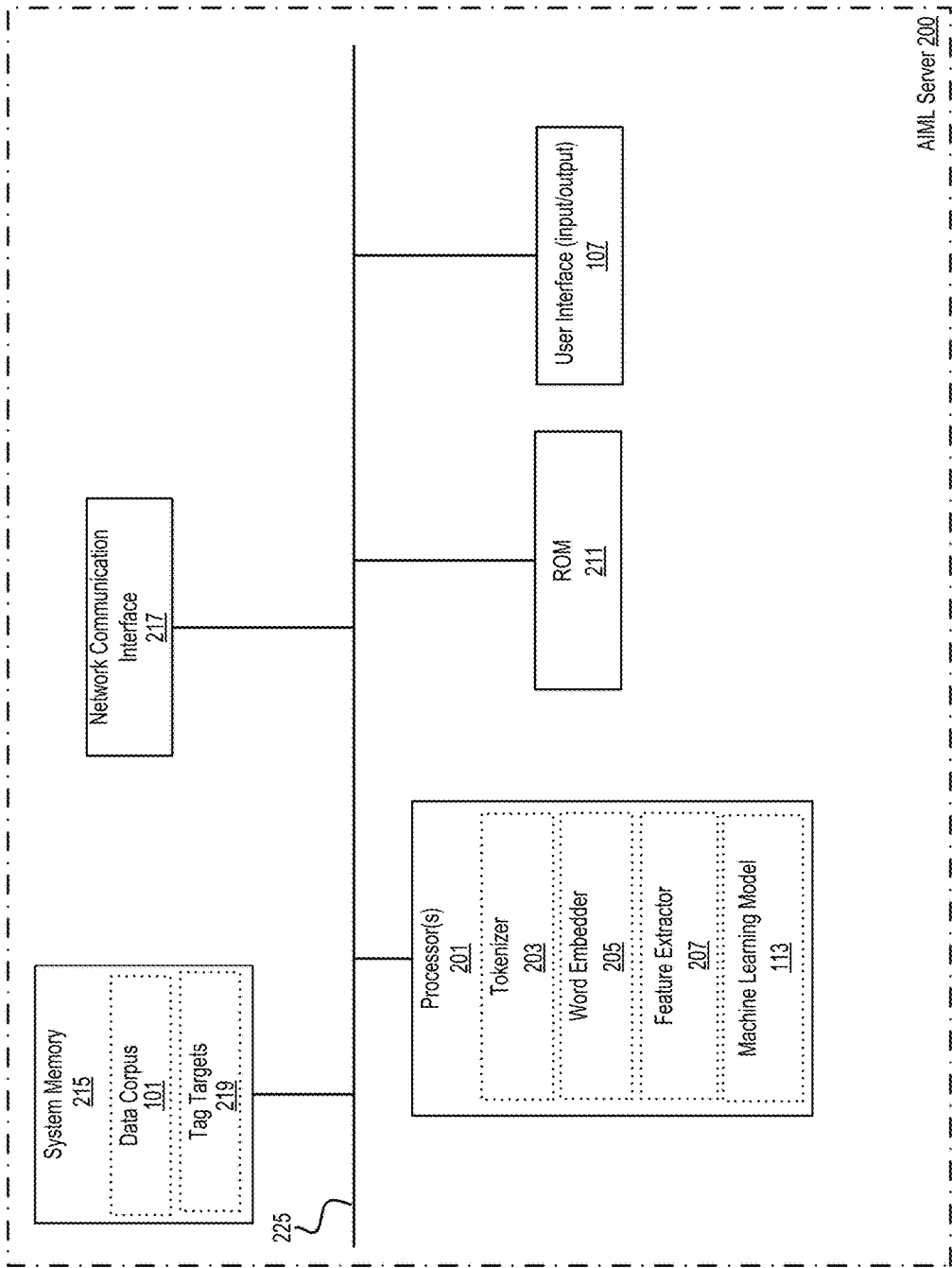
FIG. 2 is an example of a compute device configuration for an implementation of a system for asynchronous and interactive machine learning using word embedding within text-based and multimodal documents, according to one embodiment.

Network communication interface 217 communicatively couples AIML server 200 to a network (not shown in FIG. 2). Network communication interface 217 can include one or more network interface cards (NICs). In some implementations, network communication interface 217 can employ connection protocols including, direct connect, Ethernet (thick, thin, twisted pair 10/100/1000 Base T, and/or the like), Token Ring, wireless connection such as IEEE 802.11a-x, and/or the like. In some implementations, multiple network communication interfaces 217 can be used to engage with various communications networks. For instance, multiple network communication interfaces 217 can be used to enable communications of AIML server 200 over broadcast, multicast, and/or unicast networks (not shown in FIG. 2). Thus, AIML server 200 can be part of a network to provide services to a user with a client compute device that implements user interface 107.

Figure 3:
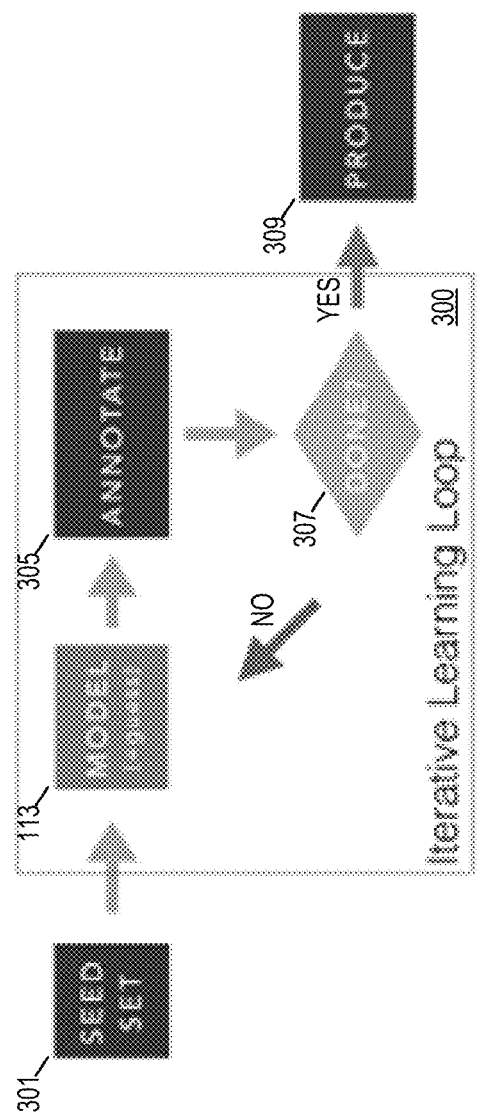
FIG. 3 is a flowchart illustrating an iterative machine learning system, according to one embodiment.

An iterative learning process is described with reference to FIG. 3, in which data corpus 101 is progressively annotated by machine learning model 113 and reviewers with support of the AIML system. In some implementations, the AIML system can use seed set 301 to train machine learning model 113. Thereafter, machine learning model 113 is trained to mirror decisions deduced from seed set 301 to generate predictive coding on data objects in a data corpus, for example, data corpus 101 discussed with reference to FIG. 1. Machine learning model 113 can then generate annotations to the data corpus. Such annotations can be, for instance, predictions on whether a data object in data corpus 101 is likely to be marked by a user with a given tag target. In some instances, users can generate annotations or associations between data objects and a tag targets. Further training can be performed as more data objects are coded or annotated.

Termination of iterative learning loop 300 is determined through conditional statement 307. In some implementations, iterative learning loop 300 can be terminated after all data objects in data corpus 101 are annotated with a tag target that is, a produced annotated version (e.g., 309) of data corpus 101. In some other implementations, iterative learning loop 300 can be terminated after machine learning model has reached a predetermined threshold or accuracy level. In some instances, when conditional statement 307 is not satisfied, machine learning model is retrained using, for example, new annotations received by users.

In some implementations, at an initial state of iterative learning process 300, no data objects in data corpus 101 have been annotated. From that point, users of the AIML system can add annotations to data objects in the data corpus via user interface 107. In some instances, users can specify directly or indirectly tag targets to be modeled by machine learning model 113. Once a sufficient amount of annotations has been added, machine-learning model 113 is fit to the annotated data. In some implementations, the determination of whether a sufficient amount of annotations has been added to machine learning model 113 can be based on a comparison between a number of added annotations associated with a tag target and a predetermined threshold corresponding to a constant number of elements of a training set.

Figure 4:
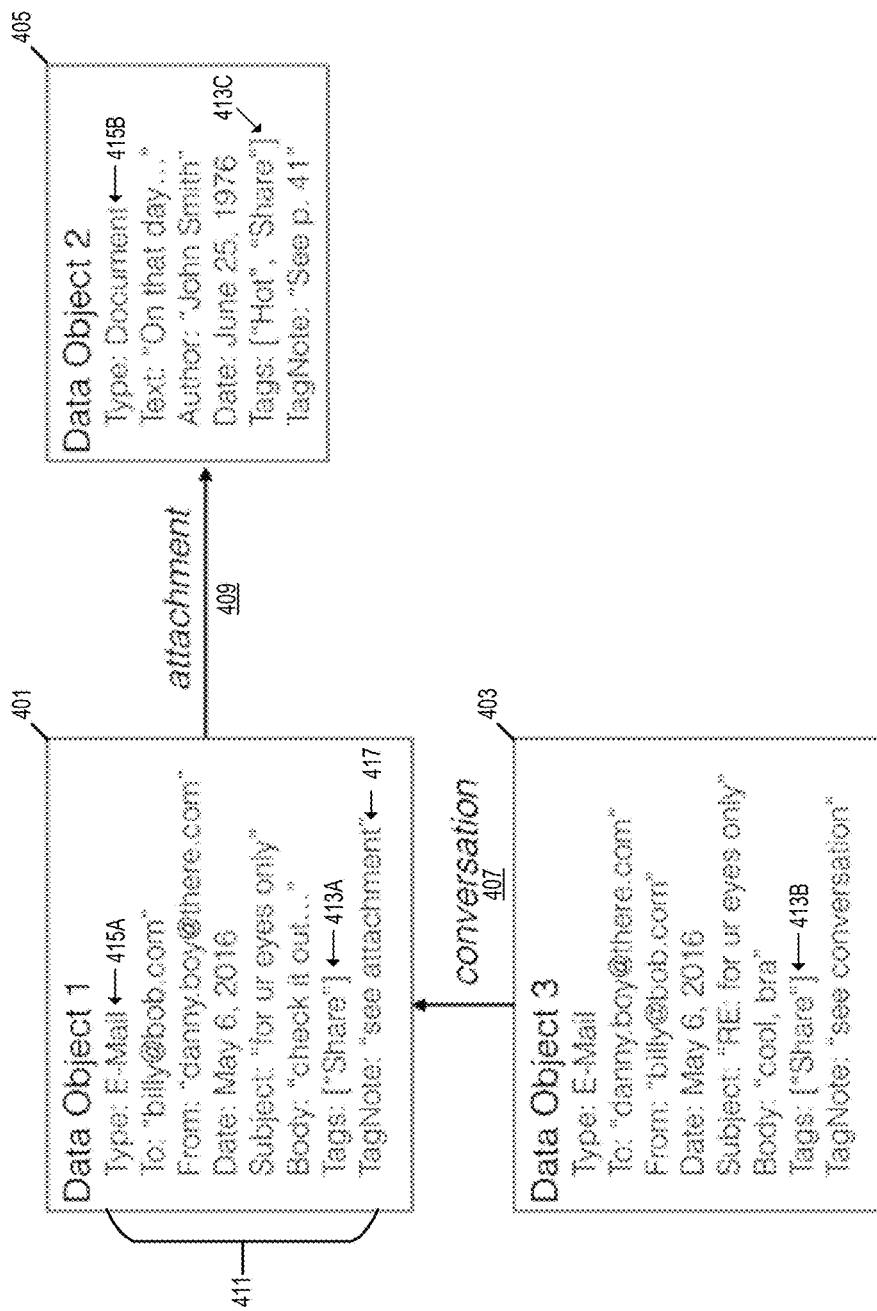
FIG. 4 is a block diagram illustrating data objects, data object attributes, and logical relations between data objects, according to an embodiment.

Examples of data objects such as the ones stored in data corpus 101 are discussed with reference to FIG. 4. Data objects 401, 403, and 405 are examples of data objects generated from an exchange of emails between two individuals. As discussed above, data objects can include a set of attributes (e.g., 411) and logical relations (e.g., 409 and 407). Specifically, data object 401 and 403 represent exchanged email documents during a conversation as indicated by logical relation 407. Data object 405 represents a text-based data object sent as an attachment to data object 401 as indicated by logical relation 409. The set of attributes included in data objects can specify tag targets associated with each data object, for instance, tag targets 413A, 413B, and 413C. In some instances tag attributes are associated with tag targets including one common term, for instance, tag attributes 413A and 413B are both associated with a tag target including the term "share." In some other instances, tag attributes can be associated with tag targets including two semantically distinct terms, for instance, tag attribute 413C is associated with a tag target including the terms "hot" and "share." In some instances, data objects can include annotations 417 received from a user via user interface 107 (shown in FIG. 1), during a review process. Data objects can have additional descriptive attributes, for instance, a descriptive attribute indicating the type of document they represent as shown at 415A (e-mail type) and 415B (document type). Machine learning model 113 can generate predictions and machine-generated judgements based on the attributes contained by each data object and their logical relations.

In some implementations, annotations such as 417, assignations or corrections of tag targets 413A, 413B, and 413C can be executed asynchronously from training and/or retraining processes executed by the AIML server 200 and machine learning model 113. In other words, user interactions, including annotations and tag signals performed by a user via user interface 107 can be executed asynchronously or decoupled from the training or learning phase executed on machine learning model 113. AIML server 200 monitors user interactions, annotations, tag signals, and corrective tag signals to continuously improve the accuracy of predictions made by machine learning model 113 in a non-intrusive way to the user. Thus, a user can start a review process of data corpus 101 at any time irrespectively of whether or not machine learning model 113 has been trained or has achieved an optimal predictive accuracy. While a user keeps providing inputs to AIML server 200 (e.g., annotations, tag signals, corrective tag signals, new defined tag signals, or other suitable inputs), machine learning model 113 is fit, retrained, and/or adjusted based on new knowledge extracted from such user's inputs.

Active learning refers to applications of iterative machine learning in which user-machine interactions are structured into batches, where the batches are chosen by a machine learning system to optimize some predetermined criterion, such as the number of examples that must be labelled or tagged prior to some prediction quality being obtained. In some implementations, the AIML system uses a combination of active learning and interactive learning. In active learning, machine learning model 113 can control which data objects shall be annotated, while in interactive learning, a machine learning model and a user can cooperate to determine which data objects shall be annotated. In some implementations, the AIML system enables users to have a high level of control over annotations made to data corpus 101. Accordingly, in some instances, users can choose to use traditional active learning tools provided via user interface 107 to structure a data corpus review and select data objects for their review based on user-defined criteria unbeknown to machine learning model 113.

Figure 5:
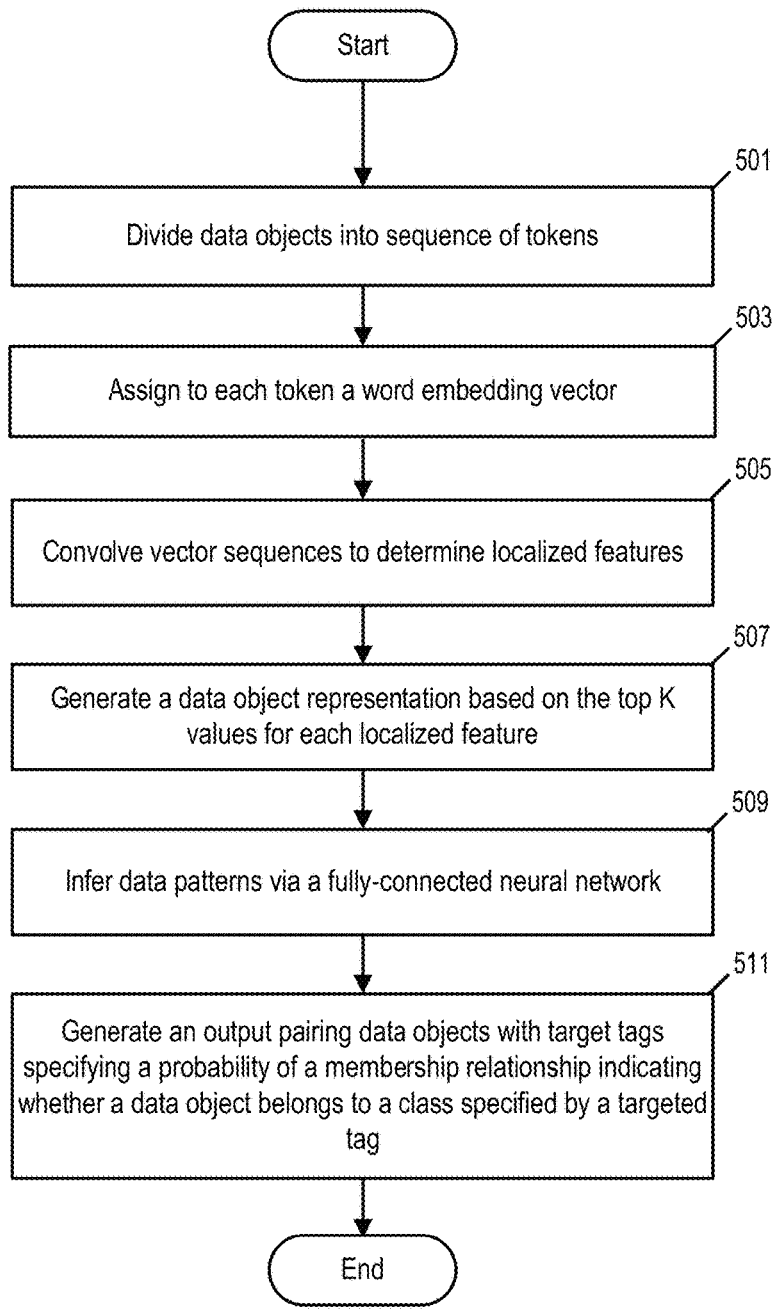
FIG. 5 is a flowchart illustrating a predictive model specifying probabilities of membership relation between data objects and tag targets, according to an embodiment.

In some implementations, the AIML system predicts tag targets for data objects in data corpus 101 by executing a process as the one illustrated in FIG. 5. At 501 the AIML system divides data objects into a sequence of tokens via tokenizer 203 shown in FIG. 2. Thereafter, word embedder 205 assigns to each token a word-embedding vector as shown at 503. Vector sequences are then convolved at 505 to determine localized features. At 507, a data object representation based on the top K values for each of the localized features is generated. A fully-connected neural network infers at 509 data patterns based on the localized features. At 511, an output pairing data objects with tag targets specifying a probability of a membership relation indicating whether a data object belongs to a class specified by a tag target is generated such a membership relation can include a membership degree, a probability, a score or other suitable value to describe the strength and/or direction of the relation. A detailed description of each of the operations described in the flow chart illustrated in FIG. 5 is provided in the below sections.

In some implementations, the AIML system relies on a "continuous asynchronous learning" machine learning strategy. Such strategy is continuous because machine learning model 113 is trained continually during users' review of data corpus 101. The strategy is asynchronous because the users' workflow is decoupled from the training phase of machine learning model 113; the training of machine learning model 113 depends on the ongoing stream of annotations received from user interface 107 during the review of data corpus 101. Advantageously, users can initiate a review of data corpus 101 via user interface 107, even when machine learning model 113 has not been trained at all or has not reached its peak in terms of prediction accuracy. The accuracy of machine learning model 113 increases as users submit more annotations to data corpus 101 during a review process in part because machine learning model 113 is fit or trained iteratively based on new annotations.

In some implementations, machine learning model 113 trained through active or interactive learning behaves as a function of approximation whose inputs include a subset of a single data object's attributes and annotations, and whose outputs include sets of parameters of a probability distribution governing whether such a data object belongs to a particular tag target. In some instances, the output can include one set of parameters for each tag target.

Formally, data corpus 101 can be denoted as D. If there are T tag targets, enumerated as $t_1 \ldots t_T$, the output distributions can be Bernoulli distributions or other suitable distributions so that the outputs can be modeled as a set of probabilities $p1, \ldots, p_T$ such that $p_i \in [0; 1]$ for $i=1, \ldots, T$. There is an explicitly defined feature extractor E: D→X that encodes each data object into a feature space X based on its attributes and annotations. The model is a function M: $X \to [0,1]^T$ that converts features into probabilities, one for each tag target. Thus, the composite map M° E assigns to each data object a machine prediction regarding its membership in the tag target.

The nature of the feature space and the feature extractor is domain-specific. For data objects that are text-based documents, each data object includes an attribute corresponding to its textual content. In some implementations, the AIML system extracts text from data objects representing text-based documents as a sequence of words, according to a large (e.g., >1 million) vocabulary of size N. Thus, the AIML system's feature extractor 207 tokenizes the document object using a tokenizer (e.g., open source Lucene® or other suitable tokenizer), and then converts each token into a vocabulary index with special tokens to mark unknown and numeric tokens. After extraction, the text of a document with M tokens is contained in a data structure and represented as a sequence of M positive integers, each uniquely associated with an index of a token in the vocabulary, or to a special unknown or numeric token. Likewise, the AIML system extracts other non-textual features from other data object attributes containing a text-based document.

The AIML system implements the best machine learning model among a class of models M indexed by one or more parameters. This class of models is parameterized by a space Θ via a map $\theta \to M_\theta$ for $\theta \in \Theta$. The search for a model is accomplished by minimizing a cost function C: M→ℝ over the parameter space, i.e., $$\theta^* = \mathrm{argmin}_{\theta \in \Theta} C(M_\theta) \quad (1)$$

This optimization can be accomplished in different ways depending on the selected model class. In some implementations, the AIML system uses artificial neural network models, with an optimization method based on stochastic gradient descent with mini-batches and a per-parameter second order learning rate adjustment, such as root mean square propagation, adaptive moment estimation, squared mean over root mean squared cubed, and other suitable optimization method.

In iterative learning, one or more models are trained at various times. The cost function for the $n^{th}$ training session is determined by the currently known tags. Specifically, at the time of training, there is a subset of data objects $D_n \subseteq D$ whose tag state (i.e., membership in one or more tag targets) is known. For a particular $d \in D_n$, the tag state for each of the T trainable tags can be positive, negative, or unknown. In some implementations the AIML system uses a composite cost function such that a subordinate cost function $C_i$ exists for each tag $t_i$ that depends on the model estimates for objects in the training set $D_n$ that are either positive or negative for tag $t_i$. The overall cost function is then the total cost over all tags, $$C(M_\theta) = \Sigma_i C_i(M_\theta^i), \text{ where } C_i(M_\theta^i) = \mathbb{E}_{d \sim D_n}[h(M\theta i^\circ E(d), t_i(d)] \quad (2)$$

where $M_\theta^i$ is the $i^{th}$ output distribution of, $M_\theta$, $t_i(d)$ is the tag state for the $i^{th}$ tag, and h is a per-object cost common to all tags. In some implementations the per-object cost for AIML system is the log probability (i.e., the overall per tag cost is the cross entropy) with unknown states ignored, so that with Bernoulli outputs, $$h(p, u) = \begin{cases} 0 & \text{if } u = \text{unknown} \\ -\log p & \text{if } u = \text{positive} \\ -\log|1 - p| & \text{if } u = \text{negative} \end{cases} \quad (3)$$

with the expectation rescaled to take the average only over documents whose tag state is positive or negative. The expectation $\mathbb{E}_{d \sim D_n}[\cdot]$ in Equation 2 is the expected value with respect to a distribution over the training data $D_n$ (rescaled to ignore unknowns). Such a distribution can be uniform, or non-uniform distribution, for example, using an attentive module to select instances for training or bootstrapping to develop ensemble learners.

In some implementations, the AIML system uses a machine learning model including a Convolutional Neural Network (CNN), and/or an Attention Convolutional Neural Network (ACNN), however, other suitable machine learning models can be used instead, in-sequence or parallel to CNN and ACNN models. CNNs and ACNN are instances of deep learning technologies. A deep learning model can have several parameterized computational modules called layers chained together in a graph structure. Such models are typically trained using stochastic gradient descent by applying chain rules over a graph to differentiate the cost with respect to each layer's parameters; this process is known as backpropagation. In backpropagation, each graph layer is computed as a function that is differentiable with respect to its parameters and inputs. Each layer performs a feature transformation, with the final layer transforming its input into the desired outputs.

In some implementations, the AIML system can highlight sections of a data object to show to users the factors that induced machine learning model 113 to recommend a particular tag target. This highlighting identifies which input features to the neural network model were determined to be most salient or meaningful during a classification process. In some instances, when salient input features occur within the main text or body of a document object, then the AIML system highlights the most salient sequence of text and renders the data object with the highlighted text 603 as shown in FIG. 6 via user interface 107.

In some other instances, when salient input features do not occur within the main text or body of a document, user interface 107 can send a signal to display such features using one or more different techniques. For instance, as shown in FIG. 6, each of the email fields From, Sent, To, CC, and Subject shown at 601 can be highlighted in an analogous way to text 603 when any of the email fields includes salient or meaningful features. In some instances, email fields such as the ones shown at 601 or other data can be embedded in a document as concealed metadata not readily visible to a user. In such a case, user interface 107 can display or reveal the concealed metadata to the user when such metadata includes salient or meaningful features associated with a tag target (e.g., via a pop-up window, a list, or other suitable user interface widget not shown in FIG. 6). Thus, users do not have to inspect a document for concealed information or metadata that may be relevant for classification or association with a target tag.

In yet some other instances, a document can include images relevant to a classification process. In such a case, user interface 107 can mark, frame, or highlight an image or parts of an image deemed relevant to the classification process. Machine learning model 113 shown in FIG. 2 can analyze images included in a document to determine whether an image includes features relevant to a particular tag target. For example, if a tag target includes the term "red helicopter," machine learning model 113 can determine whether an image includes a picture, image, representation, or drawing of a red helicopter and/or parts of a red helicopter. Thus, user interface 107 can display images or part of an image when images include salient features.

Figure 7:
FIG. 7 is an example of an interface and widget to correct, assert, or dismiss a highlighted section of a data object predicted to be associated with a tag target, according to an embodiment.

In some implementations, the AIML system enables users to accept, dismiss, or modify sections of a document object highlighted as salient input features or features having a high membership degree with respect to a given tag target or high probability to be marked with such a given tag target. For instance, in FIG. 7 users can send an accept tag signal (i.e., positive tag signal) or dismiss tag signal (i.e., negative tag signal) with respect to the text highlighted by machine learning model 113 via controller or widget 701, by clicking on the thumbs-up or thumbs-down buttons. Moreover, users can, for example, right click on highlighted section 703 to remove the highlight, causing the machine learning model to receive a negative tag signal with respect to a tag target for which machine learning model 113 classified the highlighted text as a salient feature. Accordingly, users can provide direct and transparent corrective feedback or corrective tag signals to machine learning model 113. User feedback is not limited to accepting, rejecting, or modifying sections of text determined to be salient by machine learning model 113. In some implementations, users can be provided with highlighted sections of metadata, images, or other input modality. Users can similarly, accept, dismiss or modify such machine-generated judgements. In some instances, explicit feedback initiated by a user is treated in the same way as an accepted machine generated highlight. Thus, in some implementations, two types of user interactions can exist with respect to highlights:
1. the user accepts or rejects a machine-generated salience judgment highlighted in any input modality; or
2. the user explicitly highlights some portion of any input modality as salient on his own initiative.

In either case, such salience judgments are specific to a particular tag target.

In some implementations, AIML system can produce machine-generated judgements also referred herein as salience judgements by extracting attribute values of a data object. As discussed above with reference to FIG. 4, data objects can include a non-empty set of labelled attributes. Each attribute from the non-empty set of labelled attributes can hold a defined property of the data object also referred herein as attribute value. Attribute values can be specified in a data type or digital data storage format that can include text, audio, images, graphics, video, and other suitable digital data types.

Figure 8:
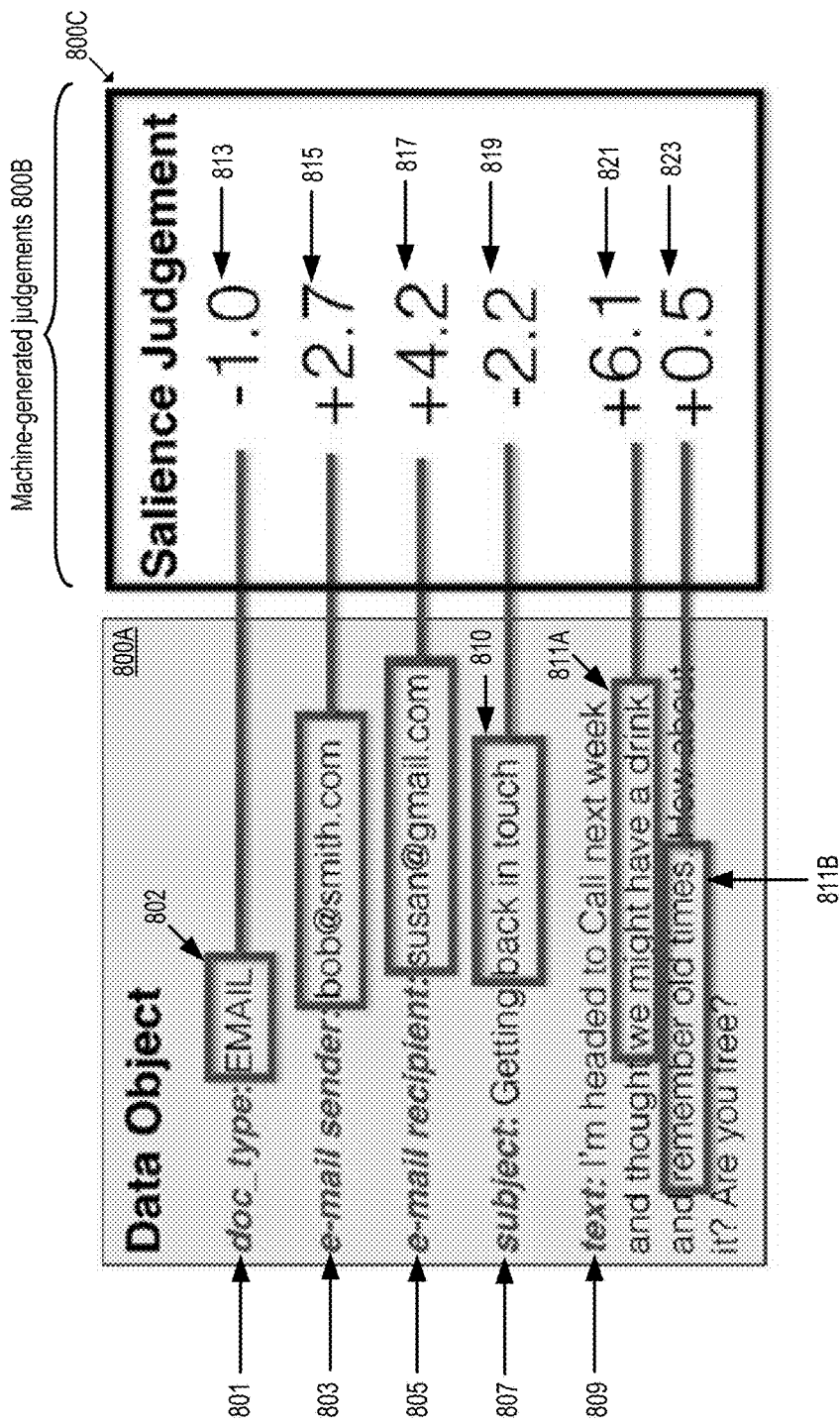
FIG. 8 is an example of a data object with salience judgement values, according to an embodiment.

An example showing a data object and a set of machine-generated judgements is discussed with reference to FIG. 8. Data object 800A can encapsulate or contain email data inspected, for example, by machine learning model 113 for the gathering of evidence during a litigation discovery process. Data object 800A can include multiple attributes such as document type identifier 801, e-mail sender 803, email recipient 805, subject 807, and main text 809. Although not shown in FIG. 8, in some instances, data object 800A can also include other attributes like carbon copy recipients, sent date or timestamp, attached documents, and data type of attached documents (if any). Each of the attributes included in data object 800A has an attribute value specified or formatted according to a given datatype. For example, attribute values of e-mail sender attribute 803 and e-mail recipient attribute 805 are specified as email address datatypes. For another example, attribute values of subject attribute 807 and main text attribute 809 are specified as text datatypes. For yet another example, a sent date attribute value (not shown in FIG. 8) can be specified as a date datatype.

Examples of machine-generated judgments 800B include salience judgment values 800C, which denote how relevant (degree of relevance) an attribute, an attribute's value, part of an attribute, or part of an attribute's value (also referred herein as attribute's region) is with respect to a tag target. Differently stated, a salience judgement value represents a measured impact (or weight) that the AIML system assigns or applies to an attribute's value at the time of classifying or recommending one or more target tags for a document object. In some implementations, salience judgement values 800C, provide insights to users about the AIML system's classification process. Specifically, salience judgement values 800C provide users with rationale applied by the AIML system to classify data objects with a particular tag target. Users can adjust or fine-tune or provide corrective feedback (or corrective tag signals) to the AIML system when they believe the salience judgement values indicate that the AIML system had misconstrue the relevancy or weight given to one or more attribute values.

In some instances, the AIML system can divide an attribute's value into one or more regions of a finite spatial extent. Such type of attributes are referred herein as spatially decomposable attributes. Spatially decomposable attributes include attributes with values specified as text datatypes that can be decomposed along a single spatial dimension, attribute with values specified as image datatypes that can be decomposed along two spatial dimensions, and attribute with values specified as video datatypes that can be decomposed along two spatial dimensions, plus a time dimension. Subject attribute 807 and main text attribute 809 are examples of spatially decomposable attributes. For example, the AIML system decomposed the value of subject attribute 807 to generate region 810, and the value of main text attribute to generate regions 811A and 811B. The AIML system can assign more than one salience judgement value to an attribute when such an attribute stores multiple spatially decomposable values. For example, salience judgement value 6.1 shown at 821 is associated with region 811A and salience judgement value 0.5 shown at 823 is associated with region 811B, both salience judgements are assigned to main text attribute 809.

In some other instances, an attribute's value can be specified as a datatype that is not spatially decomposable; such attributes are sometimes referred herein as non-spatially decomposable attributes. Doc-type attribute 801, e-mail sender attribute 803, and e-mail sender recipient 805, are examples of non-spatial attributes. Note that the AIML system can assign a single salience judgement value for each non-spatial attribute as shown at 813, 815, and 817.

In some implementations, the AIML system can determine if an attribute's value can be spatially decomposed or if the attribute is a non-spatial attribute based on the datatype in which such an attribute's value is specified. For example, doc-type attribute 801 stores (or supports) attribute's value 802 specified as a document datatype. In this instance, the AIML system can be configured to not decompose attribute's values specified as document datatypes. Likewise, the AIML system can be configured to not decompose email datatypes such that, attributes 803 and 805 deemed to be non-spatial attributes and thus, their values will not be decomposed by the AIML system.

In some instances, user interface 107 (shown in FIG. 1) can display (or send a signal to display) salient regions enclosed in a box or a rectangular wireframe as shown at 811A and 811B to indicate to users that such regions embody machine-generated judgements considered salient or relevant by the AIML system for the classification of data object 800A with respect to a target tag. In some other instances, user interface 107 can highlight or emphasize such regions in other suitable ways, including showing regions in a different font type, different color, or other suitable indicator.

In some implementations, the AIML system can send a signal to or via user interface 107 to display salience judgments values 800C about a particular document object (e.g., 800A) on demand, when requested by a user. In some other implementations, user interface 107 displays salience judgements 800C by default, for instance, on a sidebar included in user interface 107 or other displayable area. In some instances, the AIML system can be configured to display salience judgement values of attributes, attribute's values, and/or regions or segments of an attribute value when their latent (or potential) salience value $\hat{S}$ is greater than a salience threshold $\theta$. In some instances, provisional values for such a salience threshold $\theta$ can be determined experimentally by, for example, calculating descriptive statistics (e.g., median, mean, and mode), inferential statistics, or other suitable method executed on extracted relevancy values included in training sets and/or included in machine generated judgements. An ultimate or conclusive salience threshold $\theta$ can be fixed to a constant value, when, for example, after multiple iterations of calculating provisional salience thresholds $\theta$ from different training sets or machine generated judgements, salience threshold $\theta$ reaches a stable state. In some implementations, such as stable state can be determined as a function of a standard deviation of provisional salience threshold values or other suitable stability or variability index. For example, when a latent salience value of region R given by $\hat{S}(R)$ exceeds threshold $\theta$, then region R is regarded as a salient region of data object 800A. In some instances, salience S(R) can be computed to indicate the degree by which latent salience $\hat{S}$ of region R exceeds threshold $\theta$, given by $S(R)=\hat{S}(R)-\theta$. In some instances, when explicitly requested by a user the AIML system can send commands to user interface 107 such that salient regions R are visually highlighted and a tag target to which the salience judgment applies can be displayed on the user interface.

Figure 9:
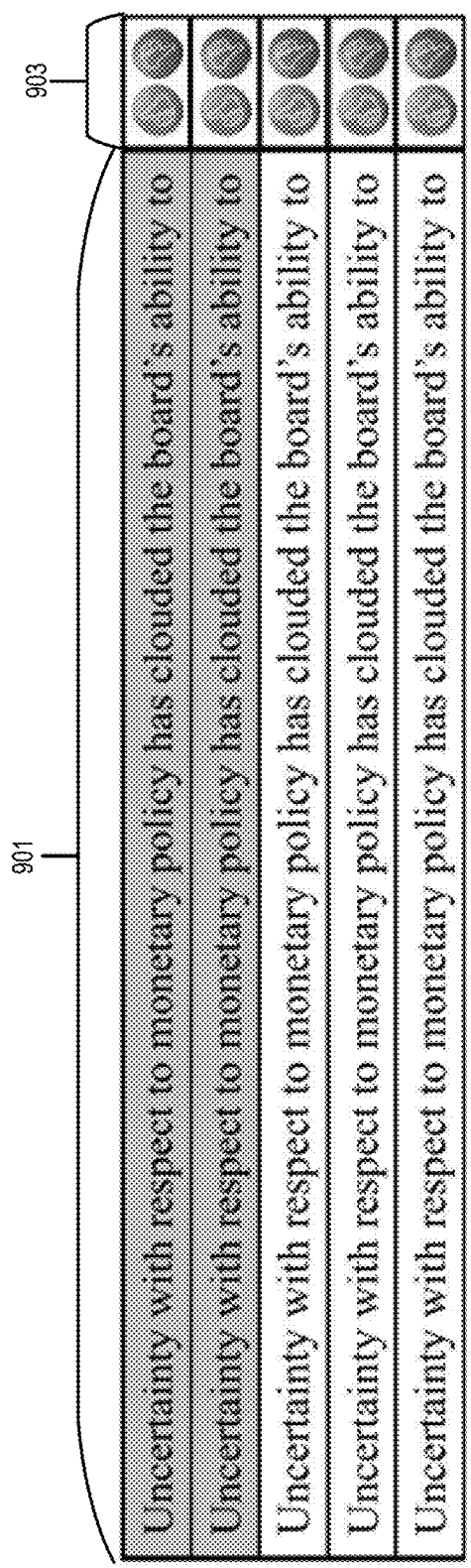
FIG. 9 is an example of an interface with a rendered list of the most salient phrases with respect to a tag target including interactive buttons to assert or dismiss list items, according to an embodiment.

In some implementations, the AIML system renders, via user interface 107 a special list view 901 shown in FIG. 9 with proposed salient regions outside of the document context. In this view, the most salient phrases with respect to a tag target are listed along with interactive buttons 903 to accept or reject the phrases as salient regions. Thus, users are able to quickly train machine learning model 113 by accepting or rejecting proposed salient regions and phrases predicted to be relevant for a given tag target.

In some implementations, a machine learning model 113 computes a function with an output $M_\theta^i(E(d))$ for each tag target $t_i$ and each document or data object d in data corpus 101. Such a function can be improved by following the gradient descent (or stochastic gradient descent) of a tag-specific cost $h(M_\theta^i(E(d), t_i(d))$. After training, the output $M_\theta^i(E(d))$ represents an estimate of the probability indicating whether a tag target $t_i$ should be applied. In some instances, when such a probability is high, then the most important features in support of the judgment of the high probability are those features that would have to change the most under optimization to change the result to a low probability output. For instance if data object 401 (shown in FIG. 4) is predicted with a high probability to be classified with a tag target including the term ["May shared emails"], removing or modifying the "Date" attribute in data object 401 from "May" to "June" can change the prediction's probability from a high probability to a low probability. Accordingly, the value "May 6, 2016" contained in the "Date" attribute field of data object 401 can be considered a salient feature with respect to the tag target including the term ["May shared emails"]. These features correspond to features with high gradients (or stochastic gradient descents) under a cost function if in fact a negative label were applied to the document. Thus, the most salient features can be identified by computing:

$$S_i(d)=\nabla_E[h(M_\theta^i(E(d)),\text{negative})] \quad (14)$$

which is the gradient descent (or stochastic gradient descent) of the sub-cost for target $t_i$ when a negative label is given to document d. The AIML system uses function $S_i(d)$ to assign a number to a data object feature; such a number indicates the strength and direction in which such a feature should be changed to support a negative classification. Those features with the largest magnitude are the ones that are likely most salient to determine that $t_i$ should receive a positive label for a document or data object d. Moreover, the AIML system can convert the value given by the function $S_i(d)$ into a magnitude. Such a conversion is specific to the modality of the input. For instance, for text that is tokenized into words, the magnitude can correspond to the absolute value given by $S_i(d)$ at a given word index (i.e., token) can be used as the magnitude such a word. For another example, for metadata the magnitude can correspond to the absolute value given by $S_i(d)$ of a given metadata feature, ignoring zero inputs. For yet another example, for images the magnitude can correspond to the Euclidean norm at each pixel (i.e., the norm over RGBA values). Resulting salience magnitudes can be thus denoted in some instances as $|S_i(d)|$. In some further implementations, the AIML system can analogously use other suitable methods to determine the salience of features of a data object.

In some implementations, the AIML system identifies the most salient regions within each modality. In the case of text-based documents, the document can be split into sentences, and each sentence is given a salience magnitude equal to the total salience of the words in the sentence divided by the log of the sentence length. Such a logarithmic adjustment provides short sentences with a fair chance to compete with respect to salience against longer sentences. Likewise, the logarithmic adjustment limits longer sentences to accrue higher levels of salience or relevance in an open-ended or undetermined way. Accordingly, in some instances, the most salient sentence in a text-based document is the sentence with the largest salience magnitude.

In some implementations, when a user accepts a machine-generated salience judgement or initiates a salience highlight on any modality, the training set is augmented with a pseudo-document consisting solely of the salient region and annotated as positive for the tag target related to the salience highlight. In some instances, when the salient factor is in metadata, then the pseudo-document includes the salient metadata value and no other information, meaning that it will have zero values for other metadata, empty text, and an empty image in a data object containing such a pseudo-document. In some instances, when the salient region is in an image, then the pseudo-document is created with only salient region of the image, empty text, and zero metadata in a data object containing such a pseudo-document. When the salient region is in text, then the pseudo-document contains only the salient text, an empty image, and zero metadata in a data object containing such a pseudo-document. If multiple salient regions are selected for a particular document, then the salient regions are concatenated to form a single pseudo-document. In some implementations, one positive pseudo-document is created per tag target per document, although a document may generate multiple positive pseudo-documents corresponding to multiple tag targets. These pseudo-documents can be hidden or conceal from the user, and added to a training set for a subsequent training phase of machine learning model 113. In some instances, when a document that caused the generation of a pseudo-document is removed from data corpus 101, then the pseudo-document is removed as well.

In some implementations, when a user rejects a machine-generated salience judgment, the AIML system produces a pseudo-document with a negative annotation for the tag target related to the salience highlight. As with positive pseudo-documents, in some implementations one negative pseudo-document is produced per tag target per document. In some instances, multiple negative salience decisions can be aggregated into a single pseudo-document just as with positively annotated pseudo-documents.

In some instances, if a user accepts or rejects a salience judgement and such a salience judgement is associated with a non-spatial attribute, then the AIML system configures the pseudo-document to contain the value of the non-spatial attribute. In such a case, the pseudo-document can be generated with empty values for all other attribute values of the data object that the user did not accept or reject. In some instances, when a user accepts a salient region shown within the value of a spatially decomposable attribute (e.g., text), the AIML system generates a pseudo-document including the accepted salient region, dismissing other regions of the spatially decomposable attribute that the user did not accept. Likewise, when a user accepts a salient region shown in an image the AIML system generates a pseudo-document including the accepted or rejected salient region, dismissing other regions in the image attribute that the user did not accept or explicitly reject. Thus, pseudo-documents can include spatially decomposable and non-spatial attributes with empty values depending on whether the user accepted or rejected such attributes.

In some instances, the AIML system can generate a pseudo-document with non-empty attribute values when a user selects multiple salient regions and/or attribute values of a single data object having a same valence (e.g., when all the selected regions or attribute values indicate a positive (or negative) relation with respect to a tag target). When a single spatial attribute of a pseudo-document has multiple salience regions, then the AIML system can generate a pseudo-document with such a single spatial attribute and assign a multiplicity of values to the single spatially decomposable attribute, i.e., one value for each salience region (as shown at 821, and 823 for attribute 809 in FIG. 8). Accordingly, a machine learning method (e.g., machine learning model 113 shown in FIG. 1) can incorporate these multiple values in a manner specific to the machine learning model being trained. For instance, a machine learning model can generate one positive pseudo-document per tag target per document, although multiple pseudo-documents corresponding to multiple tag targets can be generated from one single data object.

The data objects with pseudo-documents produced as described above can be used to assemble training sets with samples that are absent of extraneous information, allowing machine learning model 113 to focus on only the salient attributes of the document and thus increasing its predictive accuracy. Pseudo-documents can be scored for the tag target that they are associated with and can be sampled normally during score stratification sampling.

The described method for generating salience judgments and incorporating users' feedback enables the AIML system with a mechanism to augment training sets that improve the quality of machine learning model 113 and the speed at which machine learning model 113 adjusts or adapts to users feedback. Data augmentation with pseudo-documents can be used in machine learning models integrating convolutional neural networks and/or other suitable models.

Figure 10:
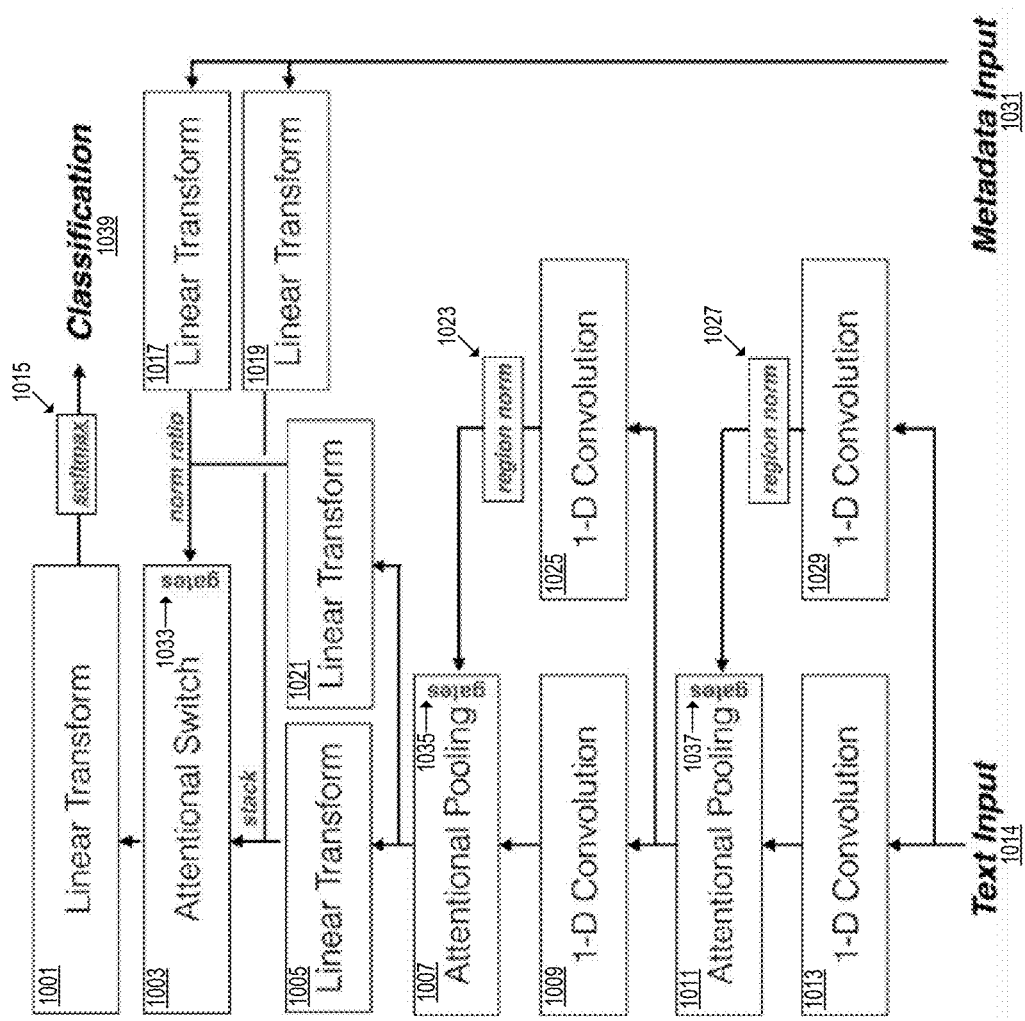
FIG. 10 is a flowchart illustrating operations performed by an attention convolutional neural network for processing bi-modal data objects including textual data and metadata, according to an embodiment.

In some implementations, an ACNN can be included in machine learning model 113. An example of an attention convolutional neural network ACNN for processing bi-modal data objects with text and a bank of metadata is discussed with reference to FIG. 10. Although the ACNN flowchart shown in FIG. 10 shows two types of inputs, inputs such as images, video, audio, and other suitable media can be additionally or alternatively integrated to an ACNN. Attentional gates 1033, 1035, and 1037 assign average values of contingent neuron values to each feature from a set of pooled features. The assigned average values are weighted based on attention values. Text input 1014 is passed through two convolutional layers (1013 and 1029) in parallel, the output of layer 1029 is normalized to, for example, a fixed-sized matrix, at each pooling region (e.g., at each region of a text line) 1027 to serve as a probabilistic attention gate. Attention pooling layer 1011 performs average regional pooling weighted according to attention gates 1037. This process is repeated by 1009, 1025, 1023, 1035, and 1007 with the output of attention pooling layer 1011, with the attention pooling layer 1007 normalizing the weights across the remaining text sequence. Metadata 1031 is linearly transformed by two separate layers (1017 and 1019), layer 1017 is used to determine attention values. The processed text input is likewise twice linearly transformed by 1005 to a matching size with the second transform 1021 used for attention values. Attentional switch 1003 normalizes gate inputs 1033 to produce a blending factor between zero and one for the metadata versus text features and then performs a blending operation. Attentional switch 1003 can be used to, for example, select between detecting features in text or metadata. A final linear transform 1001 then produces classification output 1039 which can be normalized using softmax process 1015.

A machine learning model 113 having an ACNN can integrate users feedback (e.g., acceptance tag signals, dismissal tag signals or corrective tag signals) during training periods and/or while users interact with the AIML system using a loss regularization process. Loss regularization can be used in some instances as an alternative or in addition to fitting or fine-tuning machine learning model 113 with pseudo-documents. Accordingly, a cost function can be implemented to enforce salience judgements indicated by users. In such a case, the per-target cost can be given by:

$$C_i(M_\theta^i) = \mathbb{E}_{d \sim D_n}[\tilde{h}(d) + \beta \sigma_i(d)] \tag{15}$$

where $D_n$ is a training source distribution, $\mathbb{E}_{d \sim D_n}$ is the expected value with respect to the training source distribution $D_n$ (in some instances, rescaled to ignore unknown values), $M_\theta^i$ is the model function for the $i^{th}$ tag target, $\tilde{h}=h(M_\theta^{i\circ}E(d), t_i(d))$ is a per-data-object sub-cost, and $\sigma_i(d)$ is a salience-driven regularization term with regularization factor of $\beta>0$.

In some instances, when a user accepts machine-generated judgements (e.g., a salience judgement with respect to an attribute and/or region), and indicates a salience attribute value or salience region via, for example, user interface 107, such an attribute or region can be associated with one or more attention gates of an ACNN attention. For instance, if a user accepts a salience judgement associated with a whole sentence, then an attention gate associated with such a sentence is reinforced at the ACNN. If a user highlights some words from a sentence as being salient (but not the whole sentence), then all word-level gates associated with each of those words are reinforced at the ACNN. A similar technique can be implemented when a user accepts machine-generated judgements for knowledge reinforcement when associated with metadata of a document data object. For instance, an ACNN can include attention gates specific to a particular type of metadata associated with metadata included in a document data object.

In some implementations, a salience regularizer included in machine learning model 113 adapts machine-generated judgements to tag signals received from users. For instance, let index I to index a set of all attention gates in ACNN (e.g., attention network shown in FIG. 10), so that the sequence $G=(g_k)_{k\in 1}$ enumerates all attention gates. The salience judgements on a document data object d for tag target $t_i$ can be aggregated into a first set $\Xi_i^{pos}(d)$, containing indices in I for attention gates positively reinforced for tag $t_i$, and a second set $\Xi_i^{neg}(d)$, containing indices in I for attention gates negatively reinforced for tag $t_i$. A salience regularizer can be defined as $$\sigma_i(d)=\Sigma_{k\in \Xi_i^{pos}} u(1-g_k(d))\Sigma_{k\in \Xi_i^{neg}} u(g_k(d)) \quad (16)$$

where u(z) is an increasing function such as $$u(z) = \frac{1}{2}z^2$$

and $g_k(d)$ indicates the state of the attention gate $g_k$ when the ACNN is run on input d. The regularizer shown at equation (16) penalizes a model that set the attention gates differently from the user's feedback.

In some implementations, generation of salience judgements include two states similar to a reverse classification process. A first state includes extracting a pre-salience S(d) from a model M for each data object d. The second state includes converting pre-salience S(d) to a salience judgement by assigning potential salience values to attribute sub-regions based on the structure of an encoding function E.

A model function $M=M(\theta)$ can be improved by subtracting a gradient descent (or stochastic gradient descent) of a cost with respect to parameters $\theta$, that is $\nabla_\theta C(l,M^\circ E(d))$ for a label $l=l(d)\in\{positive,negative\}$. After training, an output $M^\circ E(d)$ estimates the probability that a particular tag should be applied to, for example, a document data object. As discussed above with reference to equation (14) the most important features in support of a salience judgment with a high probability are those features that would have to change the most during training to result in a low probability output. These features are those that would have high gradients under the cost if a negative label is applied to such a document data object. Thus, to identify the most salient features, in some instances the AIML system computes $$S(d)=\nabla_E[C(\text{negative},M^\circ E(d))] \quad (17)$$

which is the gradient (stochastic gradient descent) of the cost with a negative label for data object d. S(d) assigns a number to each numeric feature indicating how strongly and in which direction it should be changed to support a negative classification. Those features in S(d) with the largest magnitude are features that are likely most salient for determining that a data object d should receive a positive label.

In some implementations, a classification model M can produce explicit salience judgments using a second model M' and thus, producing two outputs for an input E(d), the first model being a classification equal to $M^\circ E(d)$ and the second being a pre-salience S(d). Such implementation can be enabled by, for example, an ACNN. An ACNN aggregates sequential or spatial information by learning an attention mask that allows the network to dynamically combine features from each temporal or spatial data entry. In some instances, attention masking is used to aggregate over multiple types of data including text, images, or any multidimensional or multi-modal data. Differently stated, attention masks can be used as aggregation layers in an ACNN or other suitable classification model in machine learning model 113.

In some instances, inputs to attention layers are given as multidimensional tensors, e.g., a two dimensional tensor of shape $(n_1, \ldots, n_k, c)$, where $n_1$ to $n_k$ can be, for example, spatial or temporal dimensions of an input. Inputs that can be decomposed along a single spatial dimension (e.g., text) can be structured as a one-dimensional tensor with k=1. Inputs that can be decomposed along two spatial dimensions (e.g., images) can be structured as a two dimensional tensor with k=2. Inputs that can be decomposed along three dimensions (e.g., two spatial and one temporal dimension such as video) can be structured as a three dimensional tensor with k=3 and so forth. Inputs with non-decomposable values, for instance, inputs associated with non-spatial attributes (e.g., email addresses), can be structured as a tensor with k=0 or vector of shape c. Attention layers compute probabilistic gates g as a k-tensor of shape $(n_1, \ldots, n_k)$ with a probability value (a number between zero to one), for each element of the k-tensor or sequence. An attention layer output given an input x and gate g can be computed as:

$$y = \sum_{m_1=1}^{n_1} \cdots \sum_{m_k=1}^{n_k} g_{m_1,\ldots,m_k} x_{m_1,\ldots,m_k} \quad (18)$$

where y is a 1-tensor of shape c. In some implementations, gates g can be computed by calculating a normalized similarity of input x to a learned context vector. In some other implementations, gates g can be computed according to a Long Short-Term Memory (LSTM) configuration, by applying a logistic function to a linear transformation of the layer inputs. In some instances, aggregations can be executed in patches, such that temporal and spatial extents of a sequence is merely reduced rather than removed.

In some implementations, attention gates are defined during training and can be implemented to generate salience judgments learnt by machine learning model 113 from training sets. For instance, consider any input feature i of an attention network and let 7E be any path from i to the classification output c that does not pass through any gate neurons but has at least one contingent gate neuron. For instance, a path including a link $x_{m1, \ldots, mk} \to y$ (as shown in Equation 18) would be acceptable, but a path including $g_{m1, \ldots, mk} \to y$ is not acceptable because such a path passes through a gate neuron. The gate neuron $g_{m1, \ldots, mk}$ is contingent on the link from $x_{m1, \ldots, mk} \to y$. Then the pre-salience of the path 7E on a data object d, written $S\pi$ (d), is the product of all gate values contingent on the path, $$S\pi = \Pi_{\{k | g_k \text{ is contingent on } \pi\}} g_k \qquad (19)$$

and pre-salience $S_i(d)$ of input I is given by the sum of the pre-salience of all admissible paths, $$S_i(d) = \Sigma_{\{\pi | \pi \text{ is an admissible path for } i\}} S_\pi(d) \qquad (20)$$

The pre-salience S (d) is the structure containing $S_i$ (d) for each input feature i. In some implementations, pre-salience is computed by a backpropagation for a given neural network.

In some implementations, salient regions of data object d can be determined by pushing backwards (or converting) pre-salience S (d) through encoding function E. Such a conversion is specific to the nature of function E and to the type of attributes of data object d. Accordingly, for each attribute a of d there is an encoding function $E_a$ that is specific to attribute a such that the rage of E is isomorphic to a disjoint union over the ranges of the function $E_a$, i.e., $$\text{range}(E) = \amalg_a \text{range}(E_a) \qquad (21)$$

Pre-salience S(d) partitions (or sections) into per-attribute pre-salience groups of features $S_a(d)$, one group for each attribute a. If any attribute a is associated or paired with a single neuron input, then it is a potential salience region with potential salience equal to the absolute value of the pre-salience at that neuron. If attribute a is associated with multiple neurons with input values denoted as real numbers and interpreted as a point in Euclidean space, then it is a potential salience region with potential salience equal to the norm of the vector formed from pre-salience by extracting the values of each of neuron logically related with attribute a in any order.

In some instances, an attribute a can be represented as a one-hot encoding corresponding to a single choice over options encoded as a zero-one vector with at most one neuron having the value 1. In such a case, attribute a is non-spatial attribute with a potential salience region equal to the pre-salience $S_i(d)$ where i indexes a single input with the value i.

In some instances, an attribute a can be represented by the encoding of a zero-one vector with no limitations on the number of ones, for example, an encoding of multiple choices. In such a case, attribute a is a spatially decomposable attribute and has one potential salience region for each neuron that takes on a value of 1 with potential salience equal to the absolute value of the pre-salience at those neurons.

In some instances, when an attribute a contains text data, the text can be tokenized into words, and each word can be associated or logically related with one or more neurons. Accordingly, the potential salience of each word can be determined based encoding values. For instances, if a token is represented as a one-hot encoding vector, then the pre-salience is associated or logically related with a neuron having the value of 1. If, however, a token is represented as a real number embedding, then the potential salience can be determined by the norm of pre-salience of the involved neurons. Thus, each word w can be treated as a potential salience region with a potential salience represented by $S_w$.

In some other instances, rather than considering words as the salient objects, potential salience regions can be composed by any aggregation of words. Accordingly, potential salience regions can be determined by calculating the sum of a set of words and normalizing the result by either the number of aggregated words and/or by the log of the number of aggregated words. Thus, if the aggregation level is at the sentence level, then the potential salience of a sentence σ with a set of words w can be given by:

$$S(d) = \frac{1}{\log|\sigma|} \sum_{w \in \sigma} S_w \qquad (22)$$

where $|\sigma|$ is the length of sentence σ. Likewise, aggregation of words can be executed at the paragraph level, page level, or other suitable collection of words. Accordingly, any set of aggregated words can be a potential salience region.

In some instances, when an attribute a contains image data, then each pixel of the image can be associated or assigned to one or more neurons (often called channels), and the salience of a pixel can be determined as the norm of the vector of pre-salience values extracted from those neurons. Several process can be implemented to detect salient regions within images. For instance, the top K most salient points (or pixels) in the image can be selected iteratively with a clearance radius of 5-10% of the image to prevent selection of clustered points or pixels. Thus, the first chosen point or pixel is the most salient pixel, and the second chosen point chosen is the most salient pixel that is not closer to the first chosen point than a distance corresponding to a value in the interval of [5,10] percent of the image width. Likewise, the third chosen point is the most salient pixel that is not closer to the first chosen point or the second chosen point than a distance corresponding to the value in the interval of [5,10] percent of the image width. Once the image salient points are determined, a region is associated with each point by a line search as follows. A minimum bounding box is initiated and is centered on each point with height and width equal to roughly 5-10% of the image width, based on the clearance introduced above. A salience magnitude is determined for the box as the sum of all salience magnitudes at all pixels inside the bounding box divided by the number of pixels in the box (i.e., the bounding box area). A line search is then performed to select the bounding box centered at the chosen point with the largest salience magnitude. The resulting bounding box out of the K choices is selected as the most salient region.

In some implementations, after the most salient regions have been identified in all relevant modalities for all attributes of a data object, the salience magnitudes for each attribute value or attribute region for each input modality can be scaled for cross-modality comparison. The scaling coefficient can be a fixed quantity for each modality based on experimental and observational judgments. A fixed cutoff is then applied to determine whether any of the attribute values or regions are sufficiently salient to show to the user. If any regions in any modality have a salience magnitude that exceeds the cutoff, the document is annotated with the salience regions and their normalized magnitude. The user interface 107 can then display these salience judgments graphically to the user.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

It is intended that the systems and methods described herein can be performed by software (stored in memory and/or executed on hardware), hardware, or a combination thereof. Hardware modules may include, for example, a general-purpose processor, a field programmable gates array (FPGA), and/or an application specific integrated circuit (ASIC). Software modules (executed on hardware) can be expressed in a variety of software languages (e.g., computer code), including Unix utilities, C, C++, Java™, JavaScript, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

The invention claimed is:

1. A non-transitory medium storing code representing a plurality of processor-executable instructions, the code comprising code to cause the processor to:
   produce, via a trained machine learning model implemented by an asynchronous and interactive machine learning system, a predicted value for a membership relation between a data object and a target tag;
   display, via a user interface, the data object and the target tag;
   indicate a non-empty set of identified sections of one or more attribute values of the data object supporting the membership relation between the data object and the target tag, the code to indicate the non-empty set of identified sections of the one or more attribute values including code to:
      determine a set of sections of the one or more attribute values of the data object supporting the membership relation, each section from the set of sections paired with a pre-salience value calculated as a function of a stochastic gradient descent between the data object and the target tag;
      select from the set of sections of the one or more attribute values of the data object at least one section paired with a pre-salience value greater than a salience threshold value; and
      render at the user interface, a graphical indicator highlighting the at least one section paired with a section salience value;
   enable a user, via the asynchronous and interactive machine learning system to provide at the user interface a tag signal with feedback to the trained machine learning model, the tag signal indicative of an accept input, a dismiss input, an input to modify the graphical indicator highlighting the at least one section, or an input to modify the section salience value; and
   re-train the trained machine learning model via the asynchronous and interactive machine learning system, based at least in part on the tag signal causing an accuracy improvement of the trained machine learning model.

2. The non-transitory medium of claim 1, wherein the non-empty set of identified sections of the one or more attribute values includes at least one of a set of text sections, a set of image sections, a set of video sections, or a set of metadata sections.

3. The non-transitory medium of claim 1, wherein the target tag is generated by the trained machine learning model.

4. The non-transitory medium of claim 1, wherein the code includes code to further cause the processor to:
   display, via the user interface, at least one salience value paired with an identified section from the non-empty set of identified sections of the one or more attributes of the data object.

5. The non-transitory medium of claim 1, wherein the tag signal is a first tag signal, the target tag is a first target tag, and the code includes code to further cause the processor to:
   receive a second tag signal, via the user interface, indicating a user annotation of a section of an attribute value, the user annotation associated with a second target tag; and
   re-train the trained machine learning model based at least in part on the second tag signal.

6. The non-transitory medium of claim 1, wherein the code to produce via the trained machine learning model the predicted value includes code to:

produce the predicted value based on at least one neuron of a neural network included in the machine learning model, the at least one neuron logically related with an attribute of the data object.

7. The non-transitory medium of claim 1, wherein the code to indicate the non-empty set of identified sections of the one or more attribute values includes code to:
divide a spatially decomposable attribute of the data object into a set of sections, each section from the set of sections having a finite spatial extent;
identify a section from the set of sections supporting the membership relation between the data object and the target tag; and
send a signal to display, via the user interface, a graphical indicator highlighting the identified section.

8. The non-transitory medium of claim 1, wherein the code to indicate the non-empty set of identified sections of the one or more attribute values includes code to:
identify a non-spatially decomposable attribute of the data object; and
display, via the user interface, a graphical indicator highlighting the identified non-spatially decomposable attribute.

9. The non-transitory medium of claim 1, wherein the machine learning model includes an attention neural network, the tag signal is an acceptance tag signal, and the code to re-train the trained machine learning model includes code to:
reinforce positively at least one attention gate from the attention neural network, the at least one attention gate logically associated with a section from the non-empty set of identified sections of the one or more attribute values of the data object.

10. The non-transitory medium of claim 1, wherein the machine learning model includes an attention neural network, the tag signal is a dismissal tag signal, and the code to re-train the trained machine learning model includes code to:
reinforce negatively at least one attention gate from the attention neural network, the at least one attention gate logically associated with a section from the non-empty set of identified sections of the one or more attribute values of the data object.

11. The non-transitory medium of claim 1, wherein the tag signal is an acceptance tag signal and the code to re-train the trained machine learning model includes code to:
produce a pseudo-document upon receiving the tag signal, the pseudo-document including the non-empty set of identified sections indicating a positive membership relation between the data object and the target tag; and
re-train the trained machine learning model with a training set including the pseudo-document.

12. The non-transitory medium of claim 1, wherein the tag signal is a dismissal tag signal and the code to re-train the machine learning model includes code to:
produce a pseudo-document upon receiving the tag signal, the pseudo-document including the non-empty set of identified sections indicating a negative membership relation between the data object and the target tag; and
re-train the trained machine learning model with a training set including the pseudo-document.

13. The non-transitory medium of claim 1, wherein the non-empty set of identified sections is a first non-empty set of identified sections, the tag signal is a corrective tag signal, and the code to re-train the machine learning model includes code to:
produce a pseudo-document upon receiving the tag signal, the pseudo-document including a second non-empty set of identified sections that is different from the first non-empty set of identified sections; and
re-train the trained machine learning model with a training set including the pseudo-document.

14. The non-transitory medium of claim 1, wherein the machine learning model includes an attention neural network, and the code to re-train the machine learning model includes code to:
re-train the machine learning model based at least in part on the tag signal and a loss regularization process enforcing a user salience judgement received in the tag signal.

15. A method comprising:
producing, via a trained machine learning model, implemented by an asynchronous and interactive machine learning system, a predicted value for a membership relation between a data object and a target tag;
displaying, via a user interface, the data object and the target tag;
indicating a non-empty set of identified sections of one or more attribute values of the data object supporting the membership relation between the data object and the target tag, wherein indicating includes:
determining a set of sections of the one or more attribute values of the data object supporting the membership relation, each section from the set of sections paired with a pre-salience value calculated as a function of a stochastic gradient descent between the data object and the target tag;
selecting from the set of sections of the one or more attribute values of the data object at least one section paired with a pre-salience value greater than a salience threshold value; and
rendering at the user interface, a graphical indicator highlighting the at least one section paired with a section salience value;
enabling a user, via the asynchronous and interactive machine learning system to provide at the user interface, a tag signal with feedback to the trained machine learning model, the tag signal indicative of an accept input, a dismiss input, an input to modify the graphical indicator highlighting the at least one section, or an input to modify the section salience value; and
re-training the trained machine learning model via the asynchronous and interactive machine learning system, based at least in part on the tag signal causing an accuracy improvement of the trained machine learning model.

16. The method of claim 15, wherein the predicted value indicates a probability that a user will annotate the data object with the target tag.

17. The method of claim 15, wherein the tag signal indicates one of an acceptance, a dismissal, or a correction of a machine-generated judgement.

18. The method of claim 15, further comprising:
sending a signal, via the user interface, to display machine-generated judgements associated with each identified section of the one or more attribute values of the data object.

19. The method of claim 15, wherein the trained machine learning model includes an attention neural network and re-training the trained machine learning model includes:

updating at least one attention probabilistic gate included in an attention pooling layer of the attention neural network.

* * * * *